A. AGNENI.
PLOW.
APPLICATION FILED APR. 2, 1920.
1,371,064.
Patented Mar. 8, 1921.
2 SHEETS—SHEET 1.
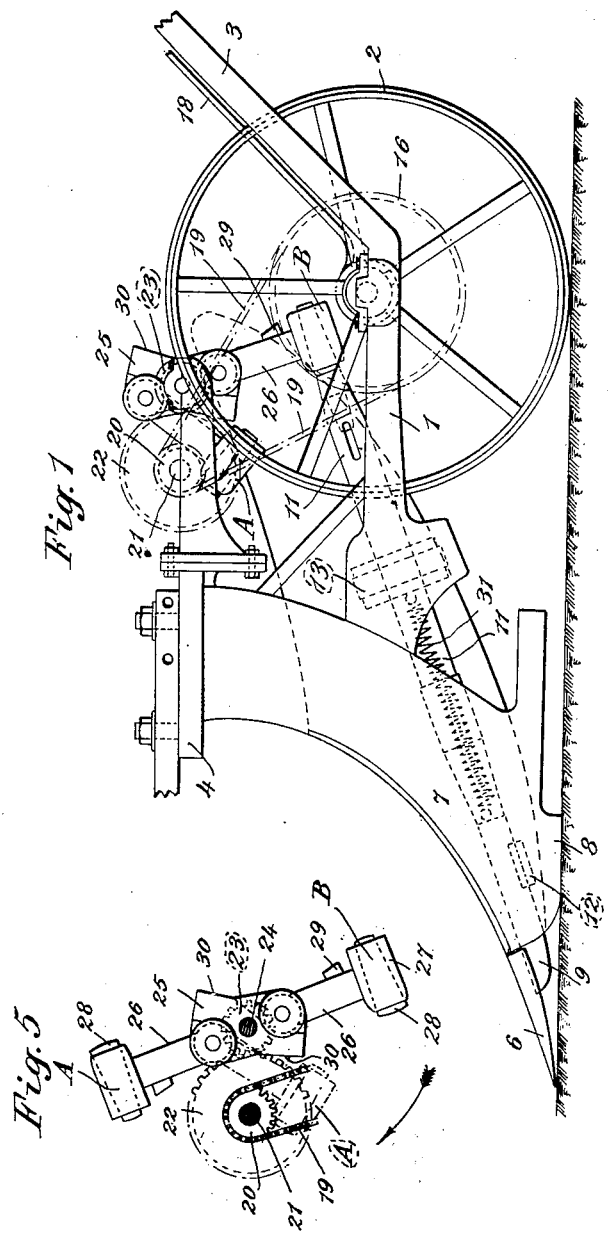
Witnesses
R. C. Rousseau
H. E. Beck Jr.
Inventor
Agnenio Agneni,
By
Attorneys.

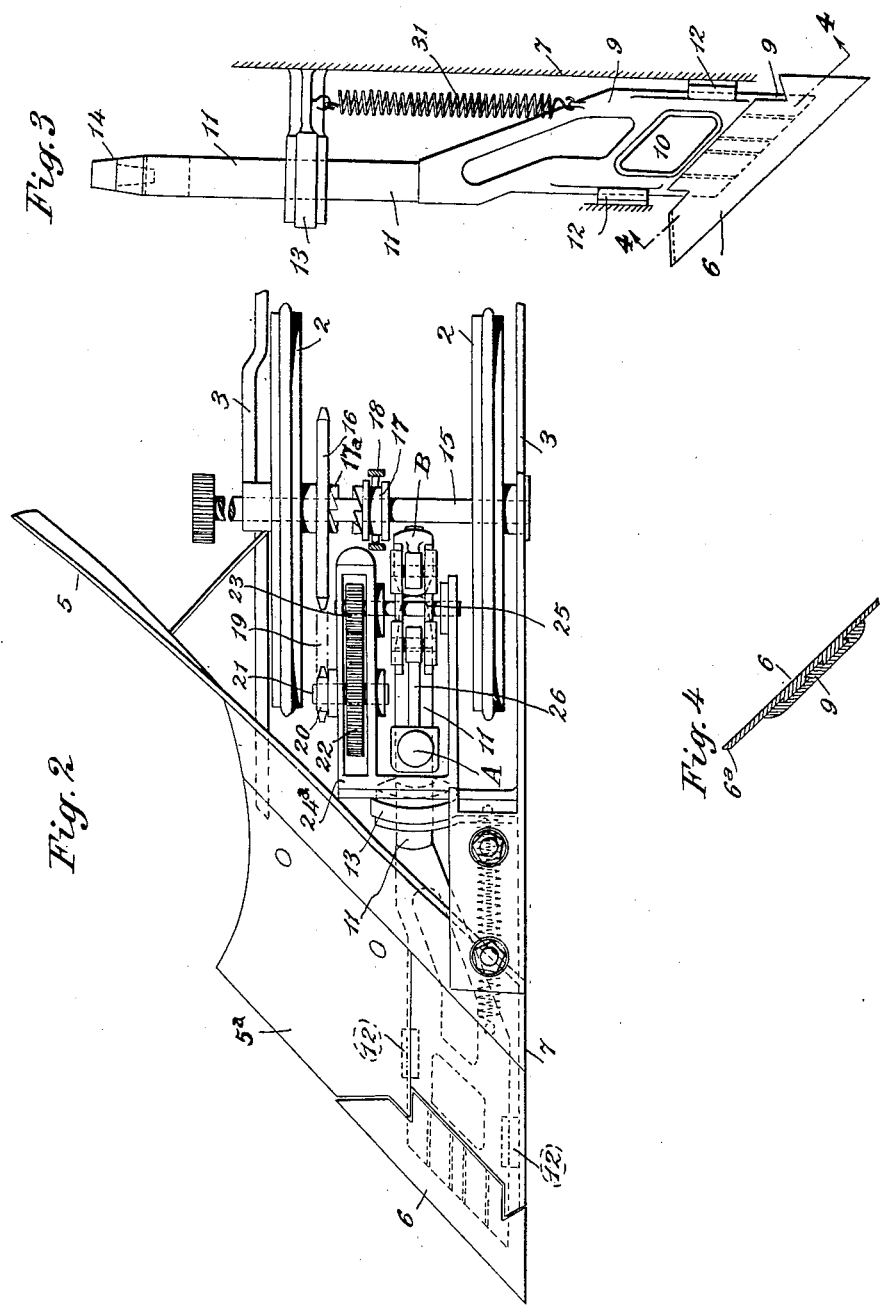

UNITED STATES PATENT OFFICE.

AGNENIO AGNENI, OF ROME, ITALY.

PLOW.

1,371,064.    Specification of Letters Patent.    Patented Mar. 8, 1921.

Application filed April 2, 1920. Serial No. 370,828.

*To all whom it may concern:*

Be it known that I, AGNENIO AGNENI, a subject of the King of Italy, and resident of Rome, Italy, have invented certain new and useful Improvements in Plows, of which the following is a specification.

The present invention relates to an agricultural implement, and more particularly to a plow, in which that part of the same, called the point, is made movable. The object of the invention is to produce a plow by means of which the plowing is facilitated owing to the fact that the breaking of the ground is effected by the movable point under the action of a blow, delivered against the point supporting member, said blow being obtained by means of a set of rotatable hammers mounted upon the plow frame.

The characteristic features of the invention will be apparent from the following description, made with reference to the accompanying drawings in which:

Figure 1 is a side elevation of a plow according to the present invention.

Fig. 2 is a plan view.

Fig. 3 is a detail of the point and of its supporting member.

Fig. 4 is a section on the line 4—4 of Fig. 3.

Fig. 5 is a detail of the hammers and their supporting and driving means.

With reference to the drawing 1 represents the frame, 2 the supporting wheels, and 3 the handles. To the front portion of the frame 1, is bolted a frame 4 which carries the moldboard 5 to the fore end of which the point 6 is fitted. The frame 4 supports also the attachment for the draft device.

To the frame 4 is fitted the combined standard and landside 7 which keeps the edge of the unplowed soil vertical and prevents it from falling into the furrow. The combined standard and landside 7 is provided with two runners 8, only one of which is shown, which by running along the bottom of the furrow act as a base for the front part of the implement.

The point 6 is supported by a supporting flat member 9 (Fig. 3) the forward end of which is provided with a certain number of dove-tail grooves into which fit the corresponding formed projections located at the underside face of the point (Fig. 4). The member 9 is slotted as shown at 10, and terminates in the form of a shaft 11 which extends well toward the rear of and between the frame 1. The side edges of the member 9 slide between the side guides 12, respectively fixed to or formed upon the inside face of the combined standard and landside 7 and the frame supporting the moldboard 5 and share 5ª. The shaft 11 extends through a suitable bearing 13 fixed in any suitable way to the frame. The end of the shaft 11, is provided with a removable head 14 of hardened metal.

As it is clearly shown in Fig. 1, the point supporting member 9 is arranged at a certain angle, which is the most convenient for the operation of the point.

The plow wheels 2 are journaled at the extremities of the axle 15. Upon the axle 15, inside the frame 1, is mounted a sprocket wheel 16 which is free to rotate about the axle. By means of a clutch, the member 17ª of which is secured to the wheel 16 and the other member 17 slidably mounted on the axle 15 and controlled by the lever 18, the wheel 16 may be locked to the axle 15 to rotate therewith. The wheel 16, through a chain 19 drives a sprocket 20, fixed to a shaft 21 provided with a gear 22. This latter engages a second gear 23, upon the shaft whereof are mounted the hammers which act on the point.

The gears 22 and 23 and the hammers are conveniently supported by a frame 24ª bolted to the frame bearing the moldboard and the other attachments of the plow.

The gear 23, driven by the sprocket 16 through the chain 19, sprocket 20 and gear 22, is keyed to a shaft 24. To this shaft, as is clearly shown in Figs. 2 and 5, is rigidly fixed a split block 25 between the sides whereof and at the ends are pivoted the hammers A and B. These latter are formed by shanks 26, and by the heads 27. Each head is bored to receive a removable cone of hardened metal 28; the larger ends of which form the striking faces of the hammers as they rotate in the direction indicated by the arrow. As it is clearly shown in Fig. 5, the shank of each hammer is provided with a bearing boss 29, which comes into contact with a flat surface 30 formed upon the split block 25. The contact takes place when the block, during its revolution, raises the hammers, which position is shown in dotted lines in Fig. 5.

Considering Fig. 1, and supposing that the plow is driven into the ground to form a furrow, and that the clutch 17, is in engagement with the sprocket 16, the rotation of the wheels 2, will cause the rotation of the shaft 24, the speed being given by the ratio of the transmission which interconnects the sprocket wheel 16 to said shaft.

The shaft 24 will thus drive the block 25, and as a consequence the hammers pivoted to it will be driven around. Considering the hammer A, the same is raised until it reaches such a position that it must fall down, and by swinging about its pivotal point of connection with the block 25, strike a blow against the head 14 of the member 9—11 supporting the point 6. The blow produced by the falling of the hammer and by the centrifugal force causes the member 9—11 to advance, pushing the point 6 into the ground and breaking the latter. In the meantime as the block 25 continues to rotate, the hammer A misses the head 14 and is raised again.

During the latter operation of the hammer A, the hammer B performs an identical function, striking a blow against the head 14.

The member 9—11, soon after the blow has been delivered is pulled back to its normal position taking with it its point by the action of a coiled spring 31 one end whereof is connected to the member 9 and the opposite end to any fixed point of the frame.

Furthermore the spring keeps the point in its normal position when the hammers are not used.

The rotation of the hammers A and B, will cause a consecutive number of blows to be delivered against the head 14, imparting a powerful forward movement to the point 6.

The action of the point 6 takes place during the advancing of the plow through the ground and as the soil has been broken by the blows given thereto by the hammers, the plowing action is facilitated.

The point 6 is made detachable, so that it may be removed when worn out, and to eliminate the use of bolts and the like, the point is secured to its support by grooves and projections as before pointed out and best shown in Fig. 4. Owing to the movement of the share a certain amount of soil is liable to fall into the space left open between the inside edges of the point and the edge of the moldboard. To prevent this, the contacting edges are sharpened as it is shown at 6ª in Fig. 4, so that the soil is forced to fall out of the space between the share and moldboard and pass out through the opening 10 in the member 9, leaving free the moving parts.

There are no sharp edges nor flat surfaces, all the parts upon which the soil may accumulate, being slanted to help the falling out of the same.

The construction may be applied to multiple share plows, with any number of wheels, and the movement necessary for the operation of the hammers may be driven from any other source than the wheels of the plow, viz from the tractor, if the motive power used is a mechanical tractor. In this case the shaft 24 is driven, through any suitable flexible transmission, directly from the power used to propel the tractor.

Having now particularly described and ascertained the nature of my invention and in what manner the same is to be performed what I claim is:—

1. A plow, comprising a mold board, a slidable point, and a percussion mechanism acting to force the point into the ground.

2. A plow, comprising a moldboard, a slidable and spring pressed point for the mold board, and a percussive mechanism acting against the action of the spring to force the point into the ground.

3. A plow, comprising a frame, a moldboard carried by the frame, a point, a support for the point slidably mounted on the frame and extending under the moldboard, means for imparting blows to the support, and means for retracting said support.

4. A plow, comprising a frame, a moldboard carried by the frame, an inclined member extending under the moldboard, and slidably mounted in the frame, a point carried by said member, a hammer for imparting blows to the member and a spring for retracting said member.

5. A plow comprising a wheel supported frame, a moldboard carried by the frame, a slidably inclined member extending under and in rear of the moldboard, a point carried by the member, a pair of rotating hammers for successively imparting blows to the member, and means for retracting said member.

6. An improved plow, comprising a moldboard carried by the frame, a movable point, a supporting member for the point, rotating hammers for imparting blows to said member, two wheels supporting the rear part of said frame, runners supporting the front part of the plow, and means for operating the hammers from said wheels.

7. In a plow, of the type described, a frame, a moldboard fitted to said frame, a movable point in front of the moldboard, a supporting member for the point and sliding in guides fixed to the frame, said supporting member being suitably inclined, a head of hardened metal fitted to the inner end of the said member, a hammer for imparting blows to said head, and means for returning the member and the point in their normal position.

8. In a plow, a wheel-supported frame, a moldboard fitted to said frame, a movable point, a supporting member for the point, a shaft, a split-block mounted upon the said shaft, hammers pivoted at points diametrically opposed upon the said block, and means for operating the said shaft from the axis of the wheels.

9. In a plow, a frame, a moldboard, a point, a supporting member for the point, a rotating elongated split block between the side whereof are pivoted the hammers, shanks pivoted at opposite points of the block, and a hammer head formed at the free end of each shank, the latter being provided with a bearing boss contacting with a flat portion of the block supporting the hammers, the heads of the hammers being provided with removable cones of hardened metal.

10. A plow of the type described, comprising a main frame, wheels to support the beam, a frame bolted to said beam, a moldboard, a movable point fitted to the fore end of the moldboard, a sliding supporting member for the point, revolving hammers for striking against the end of the supporting member, means to transmit the rotation from the wheels to the shaft supporting the revolving hammers, means to guide the point supporting member and for returning the same to its normal position after the blow has been delivered, and dovetail grooves and projections for removably securing the point to its supporting member.

11. A plow, comprising a moldboard, a movable point fitted at the fore end of the moldboard, a supporting member for the point and movable with same, revolving hammers for striking against the head of the point supporting member, means to return the same to its normal position after each blow has been delivered, and means for preventing the accumulation of the soil between the moving parts, the supporting member for the point being provided with openings for permitting the fall of the accumulated soil.

In testimony whereof I have hereunto signed my name in the presence of two witnesses.

AGNENIO AGNENI.

Witnesses:
  DUILO NARDENI,
  BORTOLUZZI TOMMASSO.